United States Patent [19]
King

[11] 4,202,008
[45] May 6, 1980

[54] PRODUCTION OF COMPOSITE IMAGES

[75] Inventor: Reginald King, Hampton, England

[73] Assignee: Evershed Power-Optics Limited, Chertsey, England

[21] Appl. No.: 782,579

[22] Filed: Mar. 29, 1977

[30] Foreign Application Priority Data

Mar. 29, 1976 [GB] United Kingdom ............... 12589/76

[51] Int. Cl.² .................. H04N 5/22; H04N 5/24
[52] U.S. Cl. .................................. 358/22; 358/185
[58] Field of Search ............... 358/22, 181, 185, 183, 358/104; 352/38, 49, 47, 85, 88; 40/606, 624

[56] References Cited

U.S. PATENT DOCUMENTS

| | | | |
|---|---|---|---|
| 2,962,547 | 11/1960 | Douglas | 358/185 |
| 2,979,832 | 4/1961 | Klemperer | 358/104 X |
| 3,580,996 | 5/1971 | Maxey | 358/104 |
| 3,610,745 | 10/1971 | Wilson | 358/85 X |
| 3,902,798 | 9/1975 | Trumbull et al. | 352/85 |
| 3,914,540 | 10/1975 | Slater | 358/183 X |
| 4,092,673 | 5/1978 | Adams | 358/183 |

*Primary Examiner*—Robert L. Griffin
*Assistant Examiner*—Aristotelis M. Psitos
*Attorney, Agent, or Firm*—Sughrue, Rothwell, Mion, Zinn and Macpeak

[57] ABSTRACT

To permit panning and tilting of the foreground camera when composite images are being produced by the color separation overlay or chroma-key technique, signals representing the panning and tilting motions of the foreground camera are used to control the movement of the background image in front of the background camera in two mutually perpendicular directions.

7 Claims, 10 Drawing Figures

PRODUCTION OF COMPOSITE IMAGES

This invention relates to the production of composite images in a colour scanning system and in particular concerns the use of the "colour separation overlay" or chroma-key technique. This technique permits the simulation in the studio of scenery to avoid the requirement for actors and crew going out on location. To use this technique, the actors perform in front of a backing which is coloured, usually blue. A background camera scans the selected background image for the shot and an output device receives signals selectively from the two cameras. The switching of the output device from the foreground camera to the background camera is brought about by the recognition of a presence of a blue signal in the output of the foreground camera and the substantial absence of signals in the other colour channels. While this blue signal is absent, the foreground camera is effective to control the output signal; as soon as the blue signal appears the output is switched to the background camera and remains with the background camera until the blue signal disappears from the output of the foreground camera.

This technique works very well and can be very effective when used correctly. However, it has one shortcoming, which is that any panning of the foreground camera not followed by the background camera produces an unrealistic effect whereby the foreground object or actor appears to slide about in front of a stationary background. A similar effect is also present in tilt movements. To pan and tilt the background camera to follow the foreground camera would require a special pan and tilt head for the background camera, responsive to the foreground signals in a complex manner and in any case would introduce keystone distortion of the background image. Because of this, in practice all scenes played in front of a chroma-key background require that the camera is locked rigidly to ensure that panning and tilting cannot occur. If the director requires normal pan and tilt movements on a process shot, it usually involves back projection or front axial projection. Back projection takes up a lot of space and presents lighting problems. Front axial projection requires special camera mountings and screen.

The present invention thus relates to a method for producing composite images in which a foreground camera views a subject in front of a coloured screen, a background camera views an image of a background scene, and a mixing circuit derives from the foreground and background cameras a composite signal which represents the foreground subject but in which the background signal is substituted for the foreground camera signal whenever the latter represents the said coloured screen; the method according to the invention further comprises deriving signals from the foreground camera representing panning and tilting movements of the camera, and controlling the position of the background image in relation to a background camera in two mutually perpendicular directions in a plane perpendicular to the optical axis of the background camera in response to the said panning and tilting signals, so that the image provided by the background camera appears to move in a direction opposite to the direction of panning or tilting movement of the foreground camera. If the foreground camera pans left, the background image is moved to the right in relation to the optical axis of the background camera; if the foreground camera pans right, the background image moves to the left. Similarly, if the foreground camera is tilted up or down the background image is moved downwards or upwards in relation to the optical axis of the fixed background camera.

Thus, apparatus for carrying out the present invention includes, in addition to the foreground and background cameras and the mixer, a pan and tilt transmitter connected to the foreground camera for deriving electric signals representing panning and tilting movement of the foreground camera, and means for moving the background image relative to the background camera in accordance with the said pan and tilt signals in two mutually perpendicular directions in a plane perpendicular to the optical axis of the background camera in such a manner that in the output signal from the mixer the background appears to move in a direction opposite to the direction of panning or tilting of the camera.

Since the foreground and background cameras may be standard, a system according to the present invention may be produced by adding to an existing camera system the pan and tilt transmitter, the means for moving the background image in the said two mutually perpendicular directions, and the coupling between the transmitter and the shifting means. The transmitter may be fitted between the pan and tilt head of the foreground camera, on the one hand, and the dolly, pedestal or crane of the foreground camera on the other hand. This transmitter may be of small size; typically a depth of 1½ inches is sufficient. It can be constructed in a form capable of being fitted in minutes.

The background image may be a still print mounted on a receiving surface in the background presenter. The image-shifting means may then comprise a simple XY mechanism which moves the picture horizontally or vertically in response to signals from the transmitter representing panning or tilting movements of the foreground camera. Where the background is a colour transparency slide or a film, a slide or film projector is mounted on a table which is made to move in such a manner as to cause the projected image to move in the said two mutually perpendicular directions in the plane perpendicular to the optical axis of the camera. Preferably, a table carrying the projector is made to pan and tilt in synchronism with the foreground camera; such movements can be produced in a relatively simple manner and are small enough for keystone distortion to be unnoticeable.

When the foreground and background images produced in a system embodying the present invention are mixed by the chroma-key process, the background scene remains in its correct position in the camera field of view during panning and tilting movements of the foreground camera.

In order that the invention may be better understood, examples of the method and apparatus embodying the invention will now be described with reference to the accompanying drawings, in which.

Figure 1:
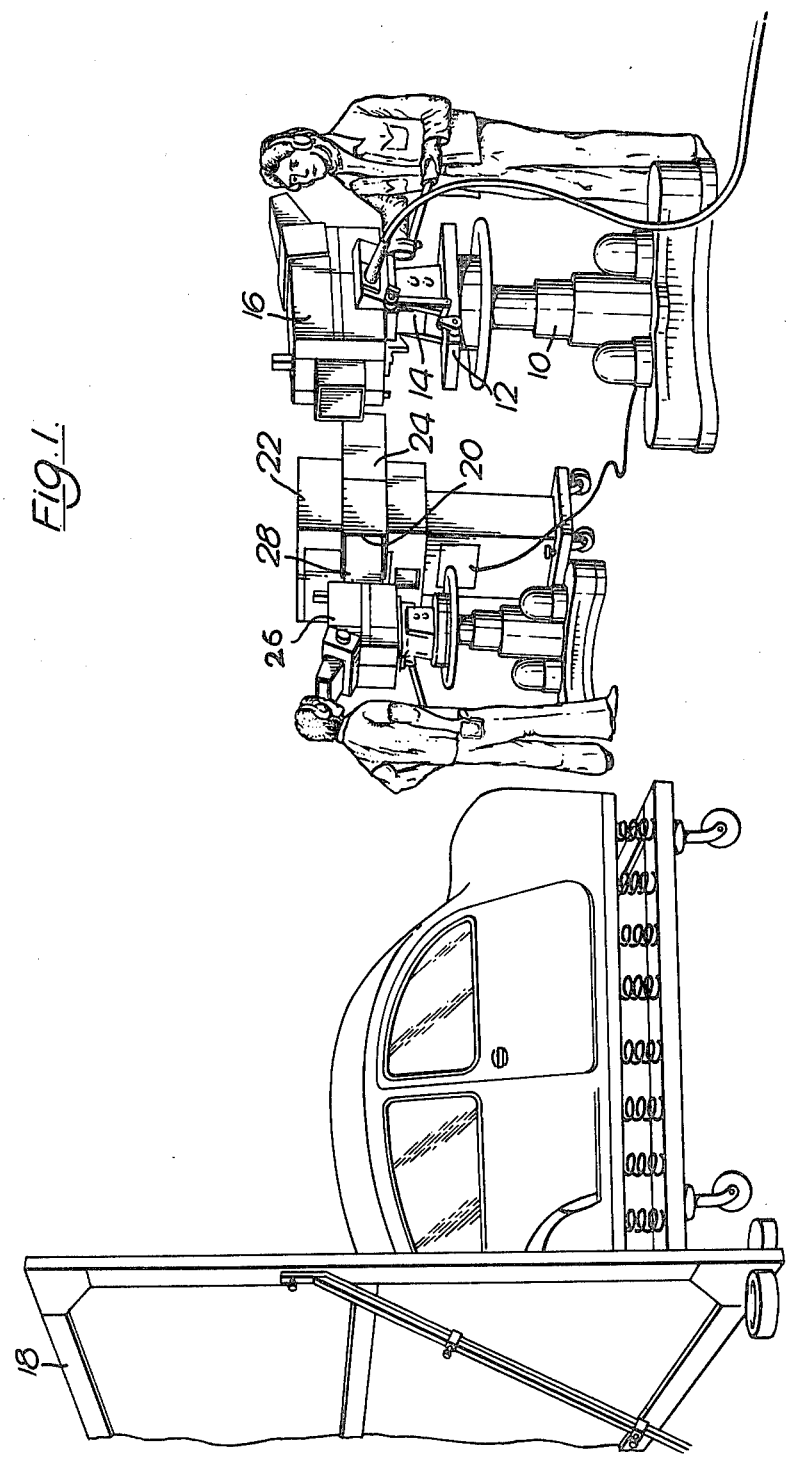
FIG. 1 illustrates the use of the invention in the studio.

In FIG. 1, a pedestal 10 supports a transmitter unit 12 on which is mounted a standard pan and tilt head 14 which in turn supports a camera 16. The camera is directed at a foreground set in front of a blue backing panel 18.

The background image is projected on to a screen 20 by means of a projector within an enclosure 22. As will be described, section 24 attached to enclosure 22 includes mirrors for deflecting the projected light on to the screen and the projector is mounted on a pan-and-tilt head coupled to an electric cable to receive signals from the pan and tilt head 12 of the transmitter. The projected background image on the screen 20 is viewed by a further camera 26 through a light-excluding cover 28. The background camera 26 has a mounting similar to that of the foreground camera 16 except that it does not include the transmitter unit 12. Panning and tilting of the projector within the enclosure 22, which a long focus lens, results in displacement of the background image on screen 20 horizontally and vertically.

As explained above, a colour overlay unit, known in itself, receives signals from the foreground and background cameras and accepts the foreground signal unless it recognises the blue of the backing panel 18, in which case it substitutes the signal from the background camera to provide a composite signal for transmission.

Figure 2:
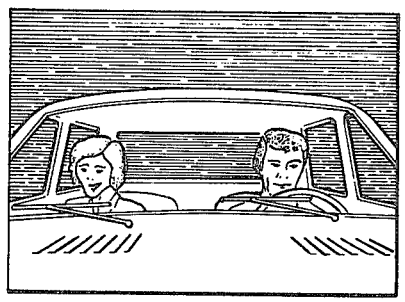
FIGS. 2 to 5 illustrate the effect on the transmitted picture of pan and tilt movements of the foreground camera when the method of the invention is employed.
Figure 3:
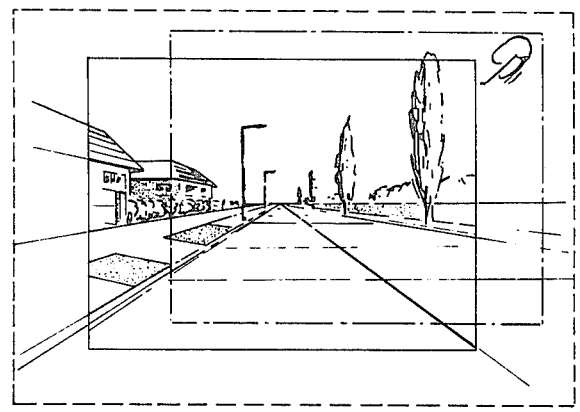
Figure 4:
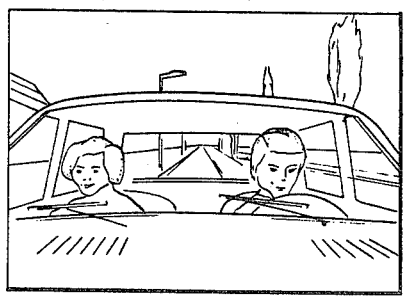

This is illustrated in FIGS. 2 to 4 of the accompanying drawings. FIG. 2 shows the scene represented by the foreground camera output with the foreground car seen against the backing panel. FIG. 3 shows within the full line rectangle and background scene represented by the output of the background camera. The outermost rectangle in dash lines represents the total extent of the background image seen on the projector unit screen. FIG. 4 shows the composite picture from the colour overlay or signal-combining unit.

Figure 5:

FIG. 5 illustrates the effect of panning the foreground camera to the right and simultaneously tilting it upward. Signals from the transmitter unit 12 of FIG. 1 representing the pan and tilt movements have been applied to the projector and have caused the background image to be moved to the left and downward, with the consequence that the stationary background camera now sees the portion of the background picture within the chain dotted rectangle of FIG. 3. The apparent movement of the background scenery to the left in relation to the car can be seen by comparing FIGS. 4 and 5.

Figure 6:
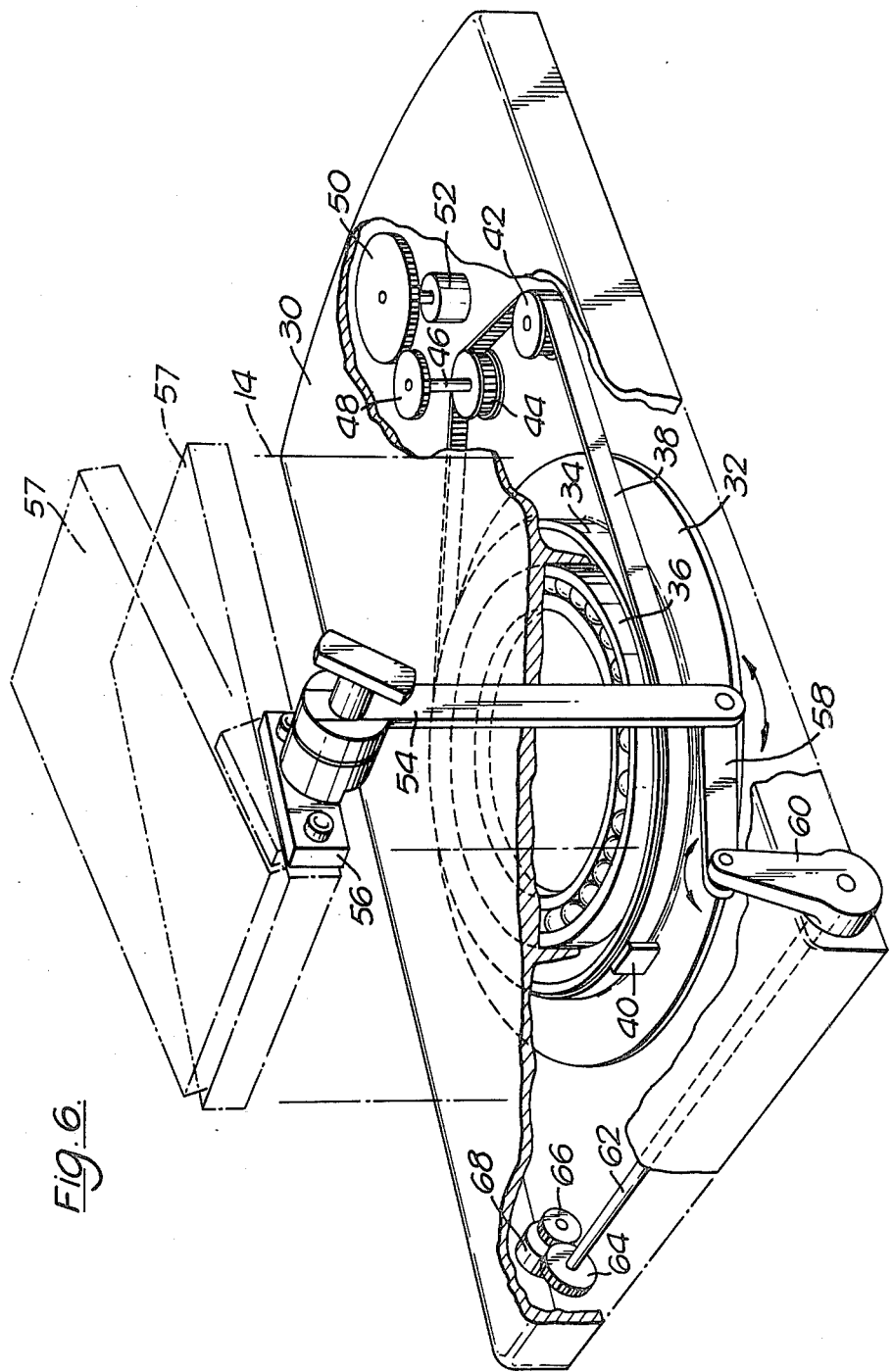
FIG. 6 is a perspective view of the transmitter unit coupled to the foreground camera of FIG. 1.

Turning now to FIG. 6, the transmitter unit 12 comprises a housing 30 within which is mounted a circular base plate 32 having an upstanding annular wall 34. The housing 30 and the base plate 32 are mounted for relative rotation, the base plate being fixed with respect to the inner race of a bearing 36 and the housing 30 being fixed with respect to the outer race of the bearing.

The pan-and-tilt head 14 is shown in dash lines mounted on the top cover of the housing 30.

When the transmitter unit is assembled between the pan and tilt head and the pedestal, in the manner illustrated in FIG. 1, the base plate 32 is bolted to the top of the pedestal, so that the housing 30 and the remaining units mounted within the housing are rotatable relative to the base plate, together with the pan and tilt head 14 and the camera mounted thereon.

A toothed belt 38 passes round and engages the flange 34 and is held against the latter by a clamp 40. This toothed belt also passes around an idler pulley 42 and a further pulley 44 connected by a shaft 46 to a gear wheel 48. The gear wheel 48 drives a gear wheel 50 mounted on a shaft which carries the wiper of the panning potentiometer 52.

The pan and tilt head 14 may be of the Vinten Mark III kind, obtainable from W. Vinten Limited of Western Way, Bury St. Edmunds, Suffolk, England, and may be of the kind illustrated in British Patent Specification No. 807,555, for example. This pan-and-tilt head includes a bearing which normally permits rotation of the camera-carrying support relative to a horizontal base plate in the pan-and-tilt head. When the transmitter unit 12 is in use, a panning lock provided in the pan-and-tilt head is applied, so that when the camera is panned the whole of the pan-and-tilt head pivots with the camera together with the housing 30 of the transmitter unit 12.

It will be seen that by virtue of the toothed belt passing around the pulleys 42 and 44, panning movement of the camera causes rotation of the wiper of the panning potentiometer 52, resulting in the provision of an output signal which represents the amount of panning movement which has taken place.

The camera supporting plate 57 and the pan-and-tilt head can pivot about a horizontal axis, for example to the position shown in chain dotted lines in FIG. 6, to tilt the camera. A link 54 is connected through an attachment block 56 to the tilting support plate 57 of the pan-and-tilt head so that when this support plate tilts, the movement is communicated through the link 54, a second link 58 and a lever 60 to a shaft 62 on which the lever 60 is mounted. The resultant rotation of the shaft acts through gears 64 and 66 on the wiper of a tilt potentiometer 68, resulting in a signal representing the extent of tilt of the camera support plate.

Figure 7:
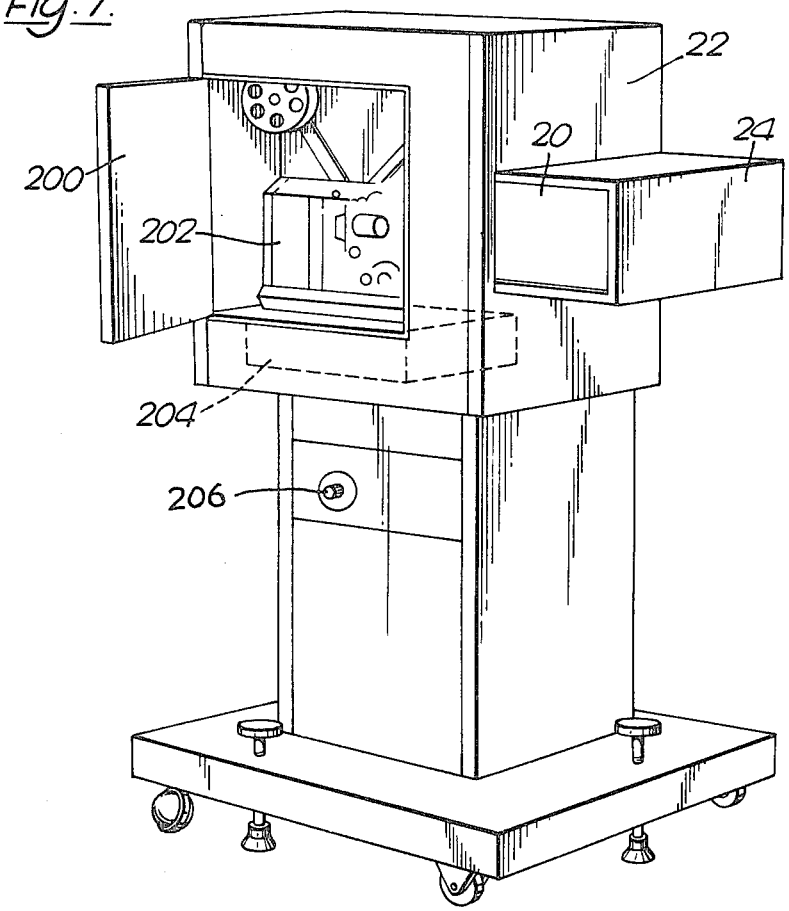
FIG. 7 illustrates a background projector which can be used in the practice of the invention.
Figure 8:
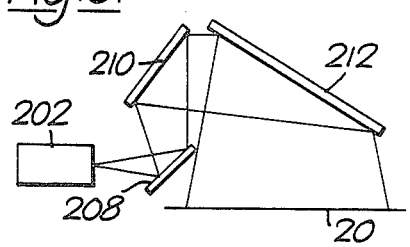
FIG. 8 shows the light pan in the projector of FIG. 7.

FIG. 7 is a perspective view of the projector unit. A door 200 gives access to a projector 202 seated on a pan-and-tilt head 204 which may follow the general arrangement of the camera pan-and-tilt head. It is controlled by signals from the transmitter unit 12 shown in FIG. 6. A control 206 permits a scale adjustment. As shown in FIG. 8, light from the projector 202 is successively deflected by mirrors 208, 210 and 212 before reaching the screen 20. Panning and tilting of the projector in response to the signals from the transmitter unit results in movement of the background image on screen 20 in two mutually perpendicular directions.

Figure 9:
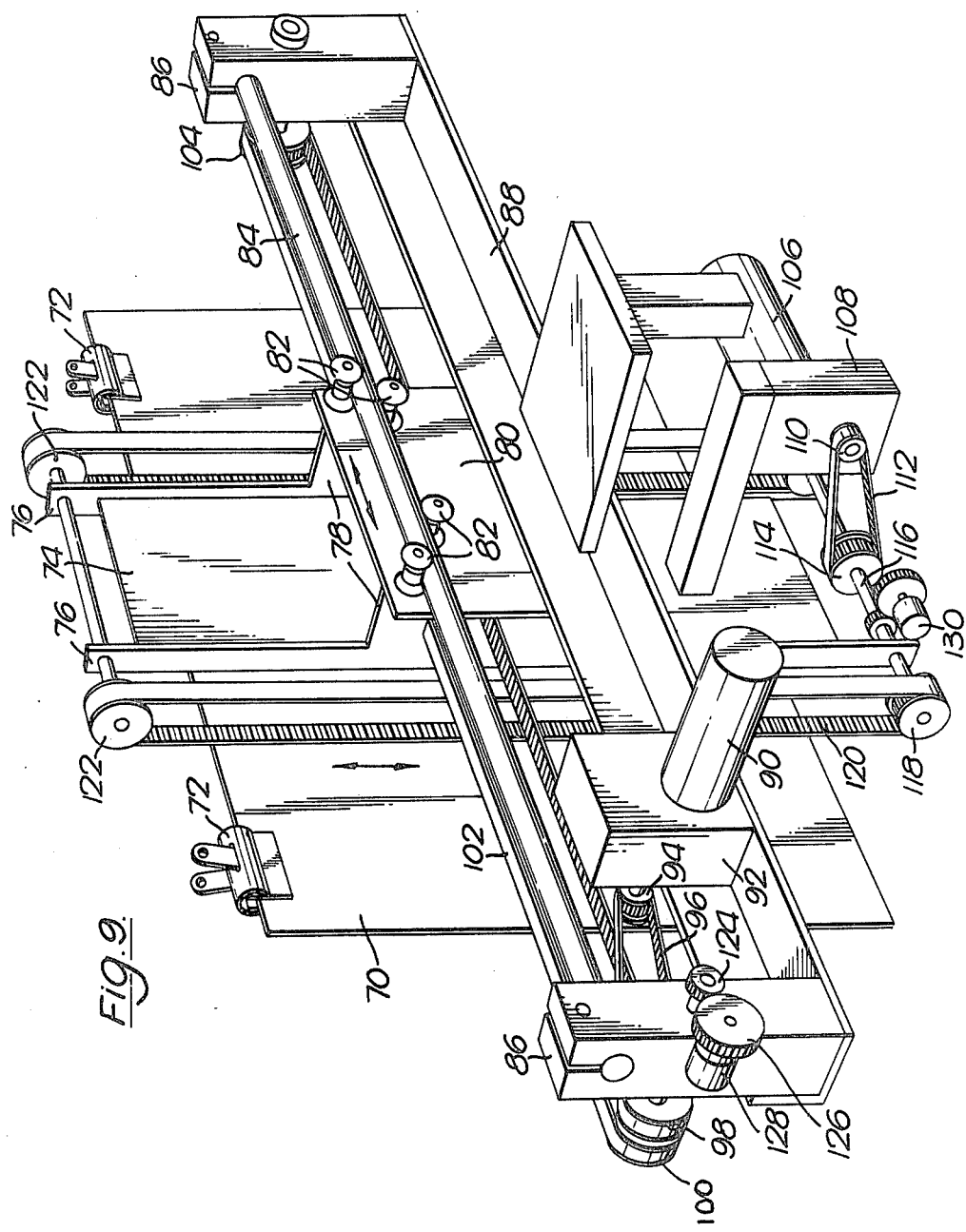
FIG. 9 is a perspective rear view of the easel mechanism for still-picture backgrounds.

As stated above, where the background scene is fixed, it is preferred to use an easel mechanism carrying a background picture. This is shown in FIG. 9, which is a rear view of the easel mechanism with the background picture in place. The background picture is attached to a graphic board 70 by means of clips 72. The board 70 is coupled, in a manner to be described, to a vertical chassis 74 including parallel uprights 76 having rearwardly extending arms 78 attaced to a rear support panel 80. The panel 80 supports carriage rollers 82 on both sides of a carriage guide rod 84 extending between pillars 86 on the main chassis 88.

The panning signal from the transmitter head is applied to the "horizontal movement" motor 90. Rotation of this motor acts through a reduction gearbox 92 to rotate a pulley 94 engaged by a toothed belt 96. The belt drives pulleys 98 and 100, mounted on a common shaft, resulting in movement of the pan carriage drive belt 102. This is an endless belt extending from the pulley 100 at the lefthand end to an idler pulley 104 at the righthand end, as seen in the drawing. The rearwardly extending arms 78 attached to the vertical chassis are clamped to the upper run of the belt 102 with the result that movement of this belt causes the background picture clipped to the graphics board to be moved to the left or to the right.

The driving signal derived from the tilt part in the transmitter unit of FIG. 6 is applied to a "vertical movement" motor 106. Rotation of this motor acts through reduction gearbox 108 to drive a pulley 110 and therewith a toothed belt 112 extending around a further pulley 114. The latter is mounted on a shaft 116 which also carries at its two ends belt-driving pulleys 118, of which only one can be seen in the drawing. These pulleys have toothed belts 120 which extend from pulleys 118 to pulleys 122 at the top of the vertical chassis. The graphics board 70 is clamped to the foremost runs of the belts 120 and consequently when the motor 106 is rotated the background image is raised or lowered. Thus, in this example, the arms 76 and 78 constitute a frame mounted on the support 86, 88 for movement relative to the support in a horizontal direction, and the foremost runs of the belt 120 constitute a second frame mounted on the first frame for movement in a vertical direction, the second frame constituted by the foremost belt runs carrying the graphic support 70.

The motor 90 also drives, through gears 124 and 126, a pan potentiometer 128, the output of which represents the actual position of the background image in the horizontal sense. Similarly, the motor 106 drives a tilt potentiometer 130, the output of which represents the position of the background image in the vertical sense.

Figure 10:
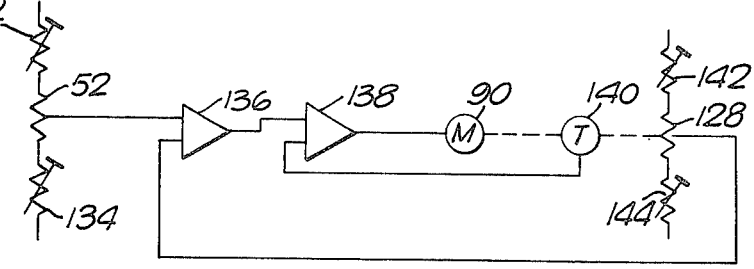
FIG. 10 is a circuit diagram illustrating the method of controlling the background picture movement on the easel of FIG. 9.

FIG. 10 shows a basic circuit diagram to link the transmitter unit 12 to the easel mechanism of FIG. 9. The diagram will be described with reference to the pan circuit but it will be appreciated that the same diagram is used to control the tilt motor.

The transmitter pan potentiometer 52 is connected, for scaling purposes, between preset potentiometers 132 and 134. The output of potentiometer 52 is applied to a pre-amplifier 136 and thence to a driving amplifier 138 controlling the "horizontal movement" motor 90 of the easel mechanism. A tacho-generator 140 provides a rate feedback signal for the driving amplifier 138. The easel "pan" potentiometer 128 is connected between preset potentiometers 142 and 144 and its wiper provides a feedback signal for the pre-amplifier 136 to complete the servo loop.

I claim:

1. A method for producing composite images in which a foreground camera views a subject in front of a colored screen, a background camera views an image of a background scene, and a mixing circuit derives from the foreground and background cameras a composite signal which represents the foreground subject but in which the background signal is substituted for the foreground camera signal whenever the latter represents said colored screen, the method further comprising the steps of:

generating signals responsive to panning and tilting movements of the foreground camera, said signals representing the extend of such movements; and mounting an opaque picture constituting the background image on a support so as to be viewed directly by the back-ground camera and moving said picture in first and second mutually perpendicular directions in a plane perpendicular to the optical axis of the background camera in response to said signals generated in response to panning and tilting movements so that the image provided by the background camera appears to move in a direction opposite to the direction of panning or tilting movement of the foreground camera, said opaque picture being larger than the shot viewed by said background camera.

2. A method for producing composite images in which a foreground camera views a subject in front of a colored screen, a background camera views an image of a background scene, and a mixing circuit derives from the foreground and background cameras a composite signal which represents the foreground subject but in which the background signal is substituted for the foreground camera signal whenever the latter represents said said colored screen, the method further comprising the steps of:

generating signals responsive to panning and tilting movements of the foreground camera, said signals representing the extent of such movements;

projecting the background image onto a screen which is viewed by the background camera from a background picture, transparency or film, the projected image being larger than the shot viewed by the background camera; and positioning the background image in relation to the background camera in first and second mutually perpendicular directions in a plane perpendicular to the optical axis of the background camera in response to said panning and tilting signals, respectively, while maintaining the background camera stationary so that the image provided by the background camera appears to move in a direction opposite to the direction of panning or tilting movement of the foreground camera.

3. A method in accordance with claim 2, including panning and tilting a projector which projects the said image onto the screen in response to the said panning and tilting signals, respectively.

4. Apparatus for generating a composite image, comprising:

a screen of a predetermined color;

a foreground television camera for viewing a foreground subject in front of the said screen;

a background television camera;

means for presenting an image of a background scene to the background camera;

mixing means for mixing the signals from the foreground and background cameras in such a manner that the foreground camera signal is present in the output of the mixing means whenever the foreground subject is represented by the signal from the foreground camera and the background signal is present in the output of the mixing means whenever the output of the foreground camera represents the colored screen;

a pan and tilt transmitter connected to the foreground camera for deriving electric signals representing panning and tilting movement of the foreground camera;

and means for moving the background image relative to the background camera in accordance with the said pan and tilt signals in two mutually perpendicular directions in a plane perpendicular to the optical axis of the background camera in such a manner that in the output signal from the mixing means the background appears to move in a direction opposite to the direction of panning or tilting of the foreground camera, wherein said background image moving means comprises a first frame mounted on a support for movement relative to the support in one of two mutually perpendicular directions, a second frame mounted on the first frame for movement with respect to the first frame in the other of the said mutually perpendicular directions, the second frame having means for receiving a background picture, said background picture being larger than the shot viewed by said background camera.

5. Apparatus in accordance with claim 4, in which the background image moving means includes two signal generators respectively generating signals representing the position of the said second frame in the said two mutually perpendicular directions, the apparatus further comprising, in a coupling between the foreground camera signal generators and the said support unit, a servo loop responsive to command signals originating at the foreground camera signal generators and also responsive to the position signals from the signal generators of the background image moving means.

6. Apparatus for generating a composite image, comprising:
   a screen of a predetermined color;
   a foreground television camera for viewing a foreground subject in front of the said screen;
   a background television camera;
   means for presenting an image of a background scene to the background camera;
   mixing means for mixing the signals from the foreground and background cameras in such a manner that the foreground camera signal is present in the output of the mixing means whenever the foreground subject is represented by the signal from the foreground camera and the background signal is present in the output of the mixing means whenever the output of the foreground camera represents the colored screen;
   a pan and tilt transmitter connected to the foreground camera for deriving electric signals representing panning and tilting movement of the foreground camera;
   and means for moving the background image relative to the background camera in accordance with the said pan and tilt signals in two mutually perpendicular directions in a plane perpendicular to the optical axis of the background camera in such a manner that in the output signal from the mixing means the background appears to move in a direction opposite to the direction of panning or tilting of the foreground camera, wherein said background image moving means comprises a projector and a background screen and means for moving the projector relative to the background screen in panning and tilting directions, the projected background image being larger than the shot viewed by the background camera.

7. Apparatus in accordance with claim 6, in which the background image moving means includes two signal generators respectively generating signals representing the position of the projector in pan and tilt, the apparatus including in a coupling between the foreground camera signal generators and the said background image moving means a servo loop responsive to command signals originating at the foreground camera signal generators and to position signals from the projector pan and tilt signal generators.

* * * * *